Aug. 20, 1940.  C. W. HARTMANN  2,212,472
APPARATUS FOR MAKING UP, PACKING, AND SEALING CARTONS
Filed May 26, 1939  6 Sheets-Sheet 1

Inventor
C. W. HARTMANN
by Rayner Ho
Attorney

Aug. 20, 1940.　　　C. W. HARTMANN　　　2,212,472
APPARATUS FOR MAKING UP, PACKING, AND SEALING CARTONS
Filed May 26, 1939　　　6 Sheets-Sheet 3

Inventor
C. W. HARTMANN
by　Rayner
Attorney

Aug. 20, 1940.    C. W. HARTMANN    2,212,472
APPARATUS FOR MAKING UP, PACKING, AND SEALING CARTONS
Filed May 26, 1939    6 Sheets-Sheet 6

Inventor
C. W. HARTMANN
by Raymer
Attorney

Patented Aug. 20, 1940

2,212,472

UNITED STATES PATENT OFFICE 2,212,472

APPARATUS FOR MAKING UP, PACKING, AND SEALING CARTONS

Carl Wilhelm Hartmann, Lyngby, near Copenhagen, Denmark, assignor to Satona Limited, Edinburgh, Scotland Application May 26, 1939, Serial No. 275,915
In Great Britain June 3, 1938

8 Claims. (Cl. 93—44.1)

This invention relates to machines for delivering carton blanks from a suitable source of supply, bringing them into the desired configuration and pre-treating them such as e. g. waterproofing them, and otherwise preparing them for filling. If desired, the present invention may be extended to include means for filling the cartons and sealing them after filling. The invention is particularly suitable for use in connection with cartons to be filled with liquids, e. g. milk, and in one form of the invention all operations from shaping the cartons to filling and sealing them can be accomplished with one machine.

According to this invention a machine for shaping, pre-treating and delivering cartons is characterised by the provision of means transferring cartons in flat tubular form individually from a supply stack to means adapted to seal the base ends of and to impart the desired configuration to the cartons, means to deform the mouth ends of the cartons into readily closed form and means to deliver them to a pre-treating, e. g. waterproofing stage, and therefrom on to means conveying the cartons to a collecting zone, or to filling and sealing means.

In carrying one form of the invention into practice the form of carton to be treated is of the type composed of cardboard or the like which can be folded flat for stacking but can be distended to form a number of walls, and being open at both ends. The preferred form of the machine embodies:

(a) Means for stacking the cartons in their flat condition;

(b) Means for delivering the carton blanks singly from the stack to rollers rotating to grip and feed each carton on to a shaping device adapted by appropriate pressure to force the sides of the carton into the open condition;

(c) Means to deliver the cartons singly on to individual formers radiating symmetrically from a common rotary support;

(d) Means to engage the pre-folded base end of each carton and to deform it into a laminated or rosette base;

(e) Means to apply pressure and heat to the base in order to render it substantially flat;

(f) Means to feed and transfer sealing labels or discs to the pressed base of each carton;

(g) Means to deform and impress the base of each carton combined with the application of heat to firmly adhere the disc or label to the carton; and (h) Means to transfer the cartons to a conveyor adapted to convey cartons successively beneath a device to effect a partial closing of the cartons.

Following the partial closing of the cartons they are delivered from the conveyor in sets of four or other convenient number by (i) intermittently operated abutments into the next stage which comprises (j) a plurality of sets of holders carried by a rotary member adapted to carry the sets of cartons through a waterproofing bath, and thereafter through drying stages. Following these waterproofing and drying operations the next stage is reached which comprises (k) means to automatically feed each set of cartons on to conveying means which can convey the cartons direct to stacking or collecting means or through a filling and sealing stage.

In order that this invention may be clearly understood and readily carried into effect drawings are appended hereto illustrating an embodiment thereof, and wherein.

Figure 1:
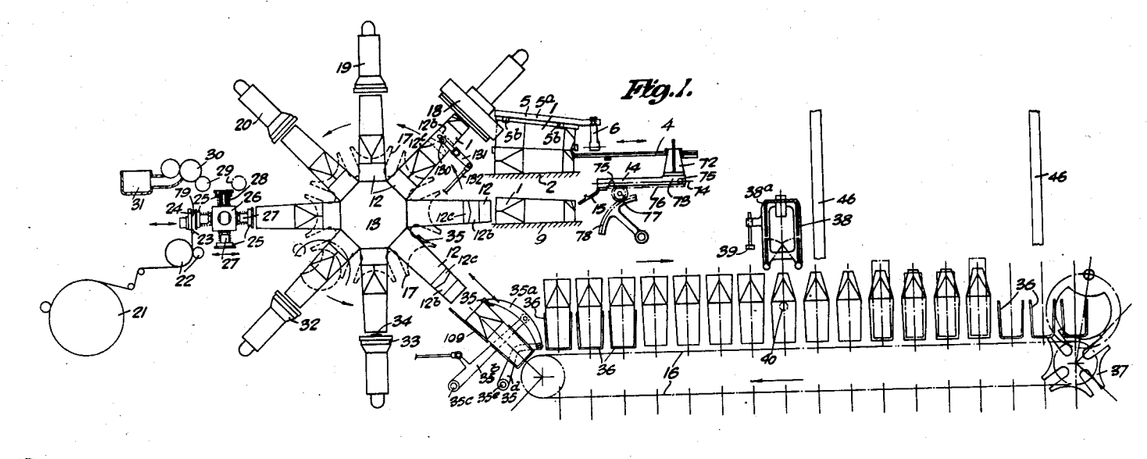
Figs. 1 and 2 are side elevations of the two sections of the machine.
Figures 2, 3, 11:
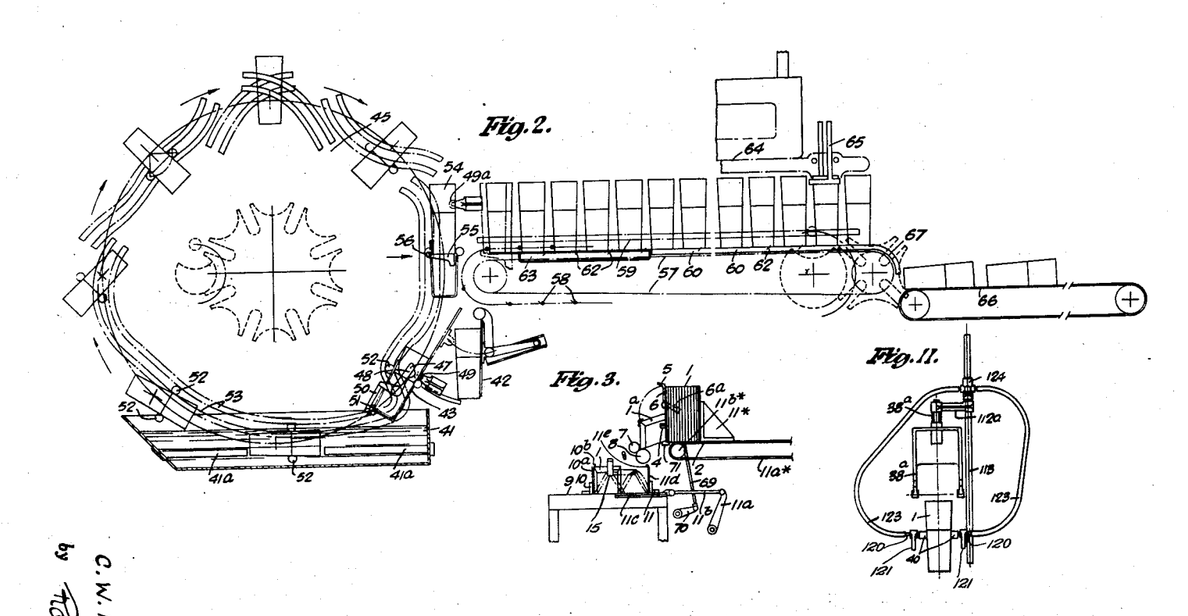
Fig. 3 illustrates the mechanism for erecting and feeding the carton blanks to the former.
Fig. 11 is a side elevation of the pleating mechanism with suction means for supporting the carton sides.

Referring more particularly to Fig. 1 of the drawings the stack of cartons I is supported on the base 2 of a suitable frame which has combined with it mechanism for initially distending each carton into tubular form, such means including a bar 4 which is engaged inside each flattened carton so as to locate one of the four walls of the square section carton firmly against the stack of cartons as shown diagrammatically in Fig. 3. Engaging the upper edge of the leading carton is a folding bar 5 which is carried across pair of swinging arms 6 which traverse the folding bar into an arcuate path forwardly whilst still engaging the same edge of the carton, and the result of this is to nearly open the carton to square tubular section so that it has a parallelogram or rhomboid cross section as indicated by the reference numeral 1a in Fig. 3. The movements imparted to the carton by the combination of the bar 4 and folding bar 5 presents one corner of the carton to the space adjacent to the converging sides of two rollers 7 and 8 having roughened peripheries and which draw the carton between them and deliver it on to a shaping plate 9 provided at one end with a pair of fixed but adjustable abutments 10, and at the other end with a pusher plate 11 which is reciprocated so as to be in rear of each carton as it falls on to the plate 9, whereupon the pusher plate engages the adjacent edge of the carton and presses it towards the abutments 10 so as to bring it into square section configuration. The carton is now of tubular form and open at both ends, the end adapted to comprise the top being presented towards and in axial alignment with one of a number of formers 12 of square section radiating symmetrically from a rotary support 13. At this stage the tubular carton is pressed on to the aligned former 12, this being effected by means of a slide 14 which is shown in Fig. 1 and moved in unison with the bar 4, and carries a finger-piece 15 adapted to engage over one edge of the open base of the carton and to press the carton on to the appropriate former 12.

By the foregoing means all of the formers 12 can be fitted with cartons and each former carries its carton through stages appropriate to sealing the base of the carton and thereupon delivering each carton on to a conveyor 16.

Figure 4:
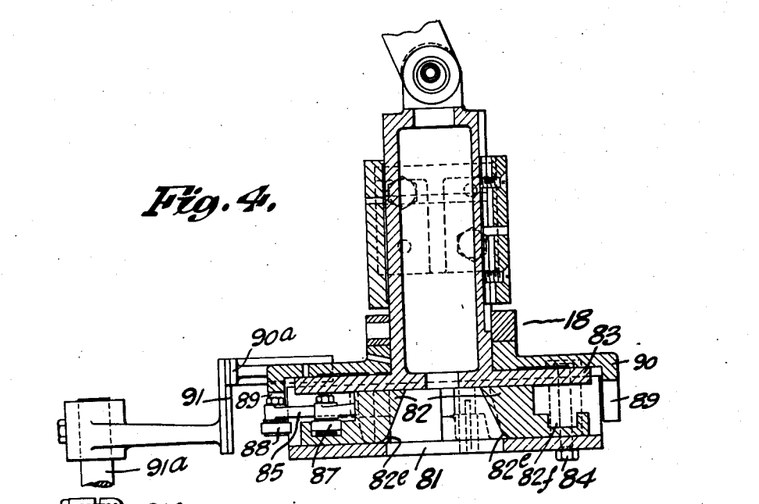
Figs. 4 and 5 are sectional elevation and plan of the mechanism for forming the rosette base of each carton.
Figure 5:
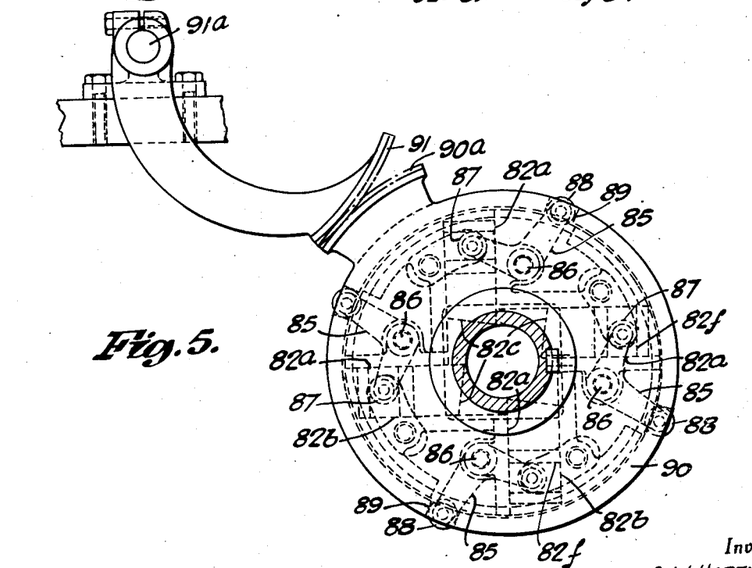

A convenient arrangement of formers is the octagonal form shown in Fig. 1, this affording eight stages the first of which is already described. The rotary structure carrying the formers travels in the direction of the arrow and is moved intermittently by any suitable mechanism such as e. g. a Maltese cross member 17 on the shaft of the rotary member 13 and the customary rotary member engaging successively in the radiating slots of the Maltese cross member. The second stage with the formers is to fold inwards the sections comprising the base of the carton, these sections being suitably creased so that when folded inwards they form a rosette base on the carton. The mechanism for forming this rosette base is shown in Figs. 4 and 5, and comprises a head 18 carrying four members hereinafter described, adapted to be moved translatively relatively to the head 18 simultaneously with the sliding movement of the head 18 radially towards the appropriate former.

Following the base-shaping stage each former carries its carton into two further stages consisting of radially reciprocated presser members 19 and 20 which are suitably heated and are urged against the opposed free end of the appropriate former so as to firmly press the rosette base into a flat condition. When the rosette base of each carton is flattened as above described, a sealing disc or label is applied thereover, and this sealing disc is coated with a suitable adhesive and pressed against the appropriate carton base. The mechanism for carrying out this operation is more clearly illustrated in Figs. 6 and 7 but it can be summarized by reference to Fig. 1 as comprising a supply roll 21 for the paper or other material, guide rolls 22 feeding the paper between a cutting bar 23 and a reciprocating knife 24. The knife 24 presses the severed piece of paper or the like on to the opposed face of one of four suction heads 25 arranged cruciform manner upon a common rotor 26 connected to a source of suction. Each suction head 25 is carried by a sleeve 27 which slides radially relative to the rotor 26 against the influence of a coiled compression spring 28, this inward sliding movement being effected in the first instance by the pressure of the cutter 24 against the opposed suction head, or in the second instance by the pressure of the suction head opposed to the appropriate former 12 to transfer to the base of the carton on the latter former 12 the disc or label picked up from the cutting device 24. The rotation of the suction device opens and closes ports associated therewith to connect the appropriate suction heads to a source of suction, this suction overcoming the influence of the springs 28 to maintain the suction heads carrying labels retracted until each transfers its disc or label to the base of the appropriate carton. The rotor carrying the suction heads has imparted to its reciprocating motion transverse to its axis i. e. horizontally between the cutter 24 and the opposed former 12 in order to pick up the disc or label from the cutting stage and to press the disc or label against the appropriate carton base. In the latter position the rotor 26 and the suction head opposed to the former 12 occupy relative positions which enables ports to be positioned to break the vacuum within such head.

The disc which was previously rendered adhesive by engagement with a paste transfer roller 29 and another roller 30 co-operating with a reservoir 31 for the adhesive, is now adhered to the appropriate carton and by a further movement of the rotor 13 such carton is brought into alignment with a heated press head 32 which is urged by suitable means against the base of the carton to firmly apply the label. The final stage in applying this label produces an indentation in the base of the carton, this being effected by carrying the carton opposite another heated press head 33 having a central boss 34 which forms the depression in the base of the carton. The carton is now ready for transfer to the conveyor 16, and this is effected by a further partial rotation of the rotor 13 to bring the appropriate former 12 into alignment with one of a plurality of U-shaped clips 36 arranged equi-distantly upon the conveyor 16 and each adapted to receive a carton for the purpose of carrying the cartons through a stage where they are partially closed, and thereon to means for delivering them into a waterproofing stage. The cartons are successively removed from the formers 12 by a reciprocating finger 35 operated from mechanism hereinafter described and engaging over the rim of each carton so as to draw it downwardly into the adjacent U-shaped clip 36. To hold each clip receiving a carton stationary during its transfer operation the conveyor 16 is moved intermittently by a Maltese cross device or other suitable means indicated by the reference numeral 37.

The upstanding cartons in the clips 36 on the upper track of the conveyor 16 are carried successively beneath a device 38 adapted to pinch inwardly the pre-creased upper parts of the carton. This device 38 is reciprocated from suitable mechanism and during its descent a pair of opposed fingers carried thereby are moved towards each other automatically to pinch inwards opposed sides of the appropriate carton. To ensure that the carton is firmly seated in the clip 36 during this operation it is tamped into the clip immediately before the partial closing operation, this being effected by a horizontal bar 39 projecting uni-laterally from the member 38 so as to abut against the rim of each carton immediately before it reaches the stage where it is operated upon by the device 38. Contemporaneously with this partial closing operation the two walls of the carton transverse to those which are operated upon by the said pair of fingers are restrained against collapse by engaging against opposite sides thereof a pair of suction devices 40 which at the appropriate stage applies suction to the said pair of walls to constrain them against inward movement. The means for operating the suction devices and fingers is more particularly described with reference to Figs. 8, 9, 10 and 11.

The next stage in the operations is to deliver the cartons into a wax bath 41 in order to impregnate them with wax, and the above described shaping and partial closing of the cartons is effected before the waxing stage to ensure that the creased or folded parts of the carton receive an adequate coating of wax, as otherwise if they are manipulated afterwards the wax might be cracked or broken away at the folded parts.

It is preferred to coat a number of cartons simultaneously and for this purpose a number of fingers 42 are operated to displace laterally relatively to the conveyor 16 the desired number of cartons. In the arrangement shown four cartons are displaced simultaneously by a corresponding number of fingers 42 which have a swinging and translative movement imparted to them so that they remain in contact with the cartons until they are dislodged into a line of carton supports 43 carried by a drum 45 rotating in a casing 46 surmounting the bath 41. The carton supports 43 each comprise a number of narrow circular section rods so that only line contact is made with the cartons. As each set of supports 43 becomes located at the receiving stage, a cam 47 carried by a lever 48 rides over a stationary roller 49 and is actuated to transmit movement via a link 50 to a gripping member 51 located at the base of each support.

The wax in the bath is heated by suitable heating means shown by way of example as an electric heater 41a, and during rotation of the drum 45 the holders 43 are imparted swinging movement by the engagement of rollers 52 with each set of holders with guide rails 53 provided in one end of the casing 46. During the predominating portion of this arcuate movement of the cartons their open ends are lowermost as will be seen in Fig. 2, but when reaching a position immediately above the stage where they are delivered into the bath, they are reversed so that their bases are lowermost and occupy the position indicated by the reference numeral 54 in Fig. 3 at which stage the cam 47 engages another abutment 49a to move the gripping member 51 to the carton releasing position. In this latter position a number of carton base engaging abutments 55 with upstanding fingers 56 at their rear ends are passed upwardly relatively to the holders and forwardly towards a conveyor 57 and deposit the appropriate set of cartons on to the upper track of this conveyor. This conveyor has a number of transverse rods 58 equi-distantly spaced, and these rods intersect a number of superposed longitudinal guide rails 59 so that in effect the lower end of each carton is supported at its fore and aft walls by a pair of transverse rods 58 and at its lateral walls by a pair of the rails 59. The bases of the cartons rest upon a stationary base plate 60 which is provided at several points with heated scrapers 62 to remove surplus wax from the bases of the cartons. At the entrant end of this conveying stage a tray 63 is located in juxtaposition to the upper track of the conveyor to receive wax dripping from the carton.

The cartons are now ready for filling and if desired suitable filling apparatus may be mounted on a frame 64 disposed above the cartons near the delivery end of the conveyor 60, and the cartons can be filled in single transverse sets i. e. four cartons simultaneously in the embodiment shown. Following this stage the cartons can pass through a sealing stage indicated diagrammatically by the reference numeral 65. Alternatively, the cartons need not be filled at this stage but can be delivered empty on to a collecting conveyor 66, the cartons passing through substantially a right angle over a guide 67 which deflects them on to the upper track of the conveyor 66. The cartons are tapered in form and may be nested together in suitable numbers and wrapped for delivery or storage.

Figures 12, 13, 14:
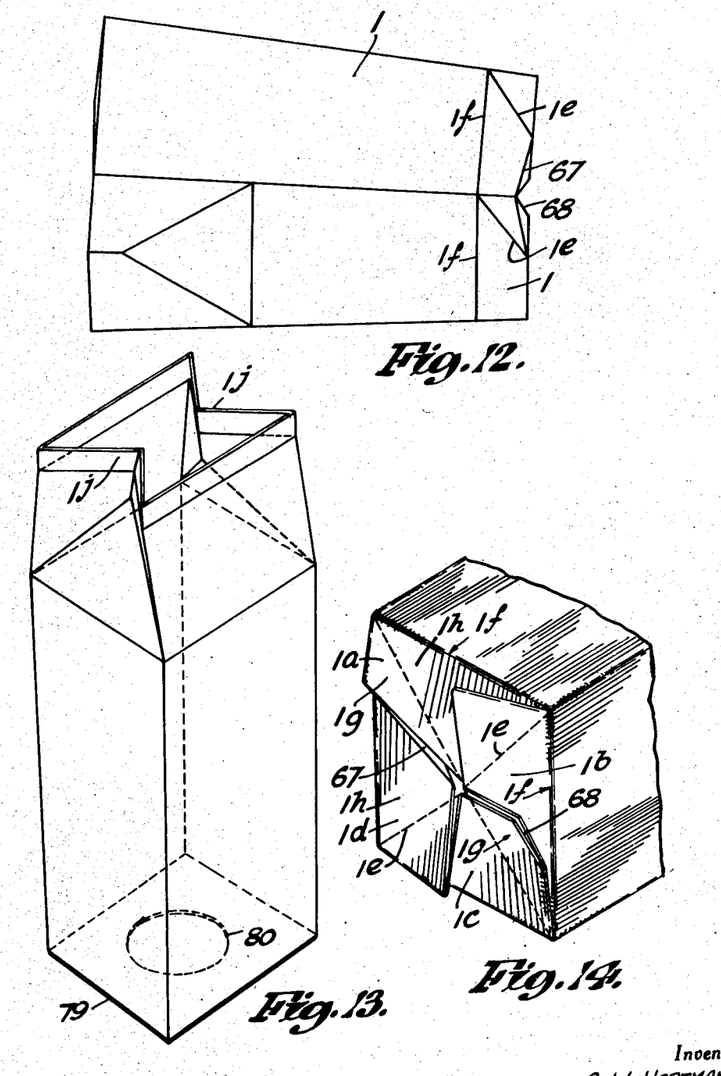
Fig. 12 shows a carton blank side glued and folded flat for feeding to the machine.
Fig. 13 shows the complete carton ready for filling and sealing.
Fig. 14 shows the rosette base of the carton.

The form of carton particularly suited for use with the machine described is shown in Figs. 11 and 13 from which it will be seen that the unfolded base end is provided in one corner with a wide V-notch 67 and in the diagonally opposite corner with a narrow V-notch 68. The pile of blanks is stacked in such manner that the notches 67 and 68 are arranged in a line midway between the upper and lower corners of the flattened tubular carton blanks. These notches enable the bar 4 to effect a magazine feeding action in conjunction with the folding bar 5 carried across two arms 6 one of which has a cranked extension 6a receiving a connecting rod 69 operated from a crank 70 to effect reciprocation of the folding bar 5.

The folding bar 5 does not actually engage the cartons but carries a longitudinal blade 5a having a bevelled lower edge, which in the uppermost position is parallel with and slightly overlaps the inner side of the upper edge of the foremost carton. Combined with this blade 5a are a number of stops in the form of metal pieces 5b which slightly overlap the front side of the foremost carton and co-operate with a raised step 71 on the front end of the base plate 2 to form abutments opposing the forward pressure of the pusher plate 11* at predetermined stages in the sequence of operations.

The bar 4 which can be termed a spreader bar is adapted to engage inside each carton in turn and it is carried by the free end of an arm 72 fixed to a carriage 73 reciprocating horizontally in guide rails 74, rollers 75 affording the requisite supporting means for the carriage. The extent of reciprocation of the bar 4 and its carriage is predetermined so as to ensure that in the rearmost position of the bar 4 its front end which is chisel pointed does not quite leave the base end of the appropriate carton, this front end having a rear terminal position which just clears the apex of the wide V 67 of the carton whereby in the rearmost position of the bar 4 immediately a carton is delivered to the rollers 7 and 8 the next carton in succession is fed forwardly by the pusher plate 11* and its wide V 67 clears the pointed end of the bar 4, and the bar 4 can now move forwardly to engage fully within the foremost carton.

The movements of the folding bar 5 and the bar 4 are regulated in such manner that as the bar 5 swings forwardly downwardly, the bar 4 is fully engaged within the carton engaged by the bar 5, and this results in the lower rear wall part of the carton blank being held flush against the stack of cartons and the remaining three walls folded in a somewhat parallel link manner relatively thereto until the corner of the carton aligned with the apex of the wide V 67 is engaged between the rollers 7 and 8. At this stage the folding bar 5 swings backwards to present its abutments 5b against the upper edge of the foremost carton of the blank and to trip the blade 5a over such edge. Immediately following this operation the bar 4 is moved rearwardly and the rotation of the rollers 7 and 8 will draw the already delivered carton away from the stack, the narrow V 68 passing over the pointed front end of the bar 4. The bar 4 immediately moves forwardly and engages in the next carton in succession ready for repeating the operation.

The rollers 7 and 8 have milled or roughened peripheries to ensure adequate gripping action on the cartons and to deliver them positively on to the shaping plate 9. The pusher plate 11* is urged forwardly by a frictional drive on an endless belt 11a* passed over a pair of rollers 11b* one of which is driven by any suitable means. The carriage 73 is reciprocated by engaging a rack bar 76 thereon with a gear wheel 77 driven from a reciprocating segment 78 operated from a suitable driving part of the machine. The pusher plate 11 acting upon the shaping plate 9 can be reciprocated by an oscillating lever 11a connected by a link 11b to a slide 11c carrying the pusher plate. The pusher plate 11 can carry a buffer member 11d shaped to engage the full side of a carton, and the abutment 10 can also carry a corresponding buffer plate 10a, the upper edges of these plates 10a and 11d being bent inwardly as at 10b and 11e respectively to fit over the adjacent corner of each carton thereby ensuring a firm support of the carton when the buffer 11d reaches its foremost position. The relative positions of a carton when passing from the rollers 7 and 8 to the shaping plate 9 and to the final box section and shaping stage are shown in broken lines. Up to this stage the carton is embraced between the pair of buffer plates and is firmly supported for substantially its full length, and the next operation is as beforesaid, to push the carton endwise on to the appropriate former 12, and this is effected by the slide 14 which comprises a plate carried by the reciprocating carriage 73 and adapted to slide between the opposed free edges of the inwardly directed parts 10b and 11e of the said buffer plates.

Referring again to Fig. 14 it will be seen that the base of the carton is folded into four trapezoidal sections 1a, 1b, 1c, 1d on diagonal creases 1e, and corner creases 1b. The action of folding the base sections on the diagonal creases 1e and the lower ends 1f of the corners of the body part produces four treble thickness parts 1g and four single thickness parts 1h in the base, and consequently in order to securely seal the base the beforesaid label (indicated by the reference numeral 79) must be applied over the base and substantial pressure must be applied to it. Likewise in order to counteract the tendency of the folded parts to open out and displace the sealing strip 79 it is desirable to distort them slightly inwardly and to stiffen them in their pressed position. For this purpose the square sealing strip 79 is adhered over the base so as to cover the free edges, and pleats of the base and the base is embossed or pressed upwardly into a boss or shallow bulge 80 at its centre.

The base of the carton can be regarded as a rosette base, and the means for producing this rosette base is more clearly illustrated in Figs. 4 and 5 in which the head 18 is an annular plate with a square opening 81 in which is engaged the base end of the carton on the appropriate former 12, the arrangement being that when the base is closed it lies in the plane of the inner face of the plate 18. The folding of the four creased sections of the base forming the rosette base is effected by the inward radial movement of our presser blocks 82 arranged between the plate 18 and a plate 83 fixed in relation to the plate 18 by bolts 84. The presser blocks 82 are of substantially square section and each has one side face 82a longer than the side face 82b parallel therewith to afford an inclined leading end 82c. The sides 82a are substantially radial in relation to the axis of the presser head, and the leading ends 82c are also inclined downwardly and rearwardly into arcuate corners 82e. It will be seen that the ends 82c which engage the creased base sections of the carton are inclined in two dimensions. It will be apparent that when the blocks 82 are urged simultaneously towards the centre of the press head the creased base sections will be folded flat, the arcuate corners 82e ensuring a smooth pressing and sliding action.

The presser blocks 82 are actuated by four bell crank levers 85 rotating on pivot pins 86 and each having on one limb a roller 87 sliding in a transverse channel 82f in each block 82. The other end of each lever carries a roller 88 engaging in a radial slot 89 in an annular ring 90 which is reciprocated through the angle appropriate to the operation of the levers 85 by a toothed segment 91 engaging a toothed segment 90a on the ring 90. The toothed segment 91 is carried by the upper end of an inclined shaft 91a, the lower end of which carries a crank having a roller engaging in a cam grooved roller.

Figure 6:
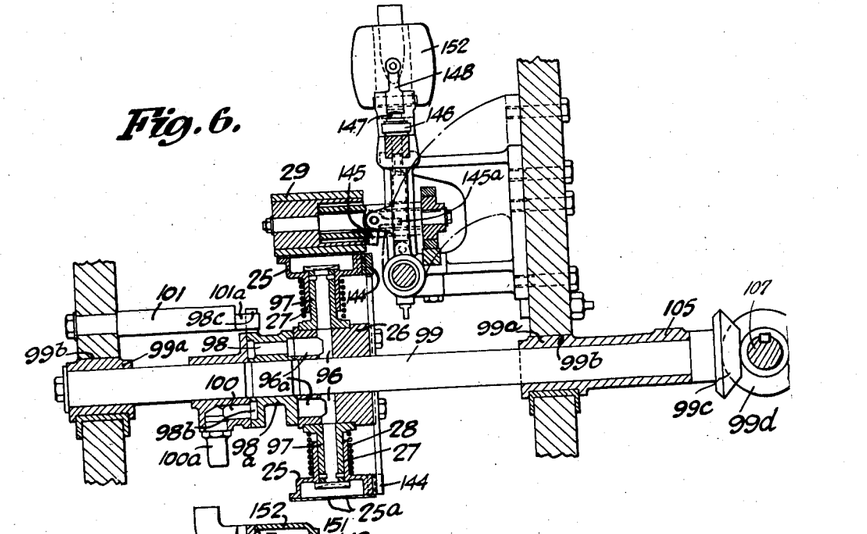
Figs. 6 and 7 are vertical sectional and elevation of the means for adhering sealing discs to the carton base.
Figure 7:
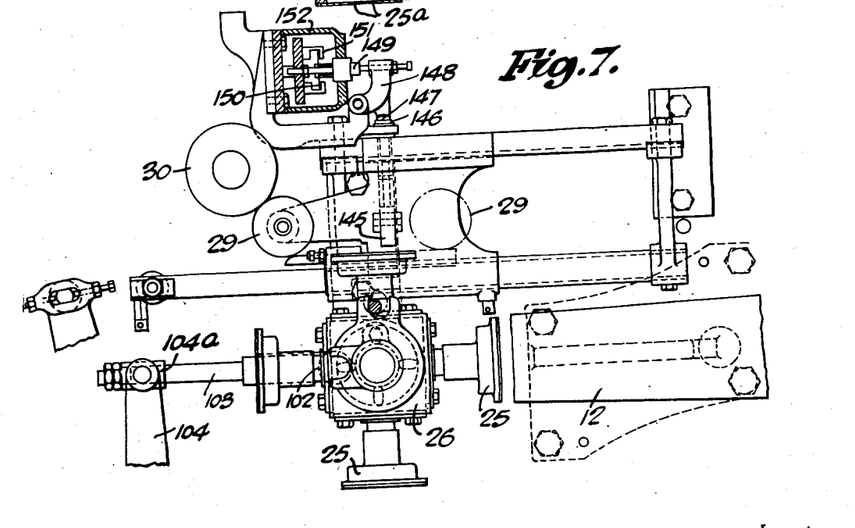

Following this pressure on the base of each carton and the subsequent application of the heated press heads 19 and 20 as already described, the carton is now fitted with a square label adhered to the pressed base. The suction heads 25 which transfer the labels to the appropriate carton are connected to the source of suction at the appropriate stages by concentric passages 96 in radial arms 97 carrying the sleeves 27. Lateral extensions 96a of each passage 97 align intermittently with suction ports 98 in a normally stationary housing 98a surrounding a shaft 99 carrying the rotor 26. The housing 98a is connected to the source of suction by an annular compartment 98b communicating with a suction conduit 100 having a suitable union 100a to receive a flexible pipe connected to the source of suction.

The cut-off and opening stages of the beforesaid ports can be regulated by a slight angular adjustment of the housing 98a, and for this purpose an adjusting bolt 101 is provided with an eccentric extremity 101a engaging in a bifurcated lug 98c on the housing 98a. As already explained the rotor 26 is moved translatively as well as rotated and this translative movement is effected by sliding the bearing sleeves 99a carrying the shaft 99 in guide slots 99b on a part of the machine frame, for which purpose one of such sleeves has a bolt 102 receiving one end of a link 103 operated from a crank 104 driven from a suitable part of the machine. This bearing sleeve 99a is formed integral with a bracket 105 at the outer end of which is a bevel pinion 99c on the shaft 99 in mesh with a bevel pinion 99d is splined on one end of a driving shaft 107 provided at its other end with a bevel pinion in mesh with a driving gear wheel driven from a suitable part of the machine. Each suction head 25 is provided with a plurality of holes 25a arranged in a plate detachably secured by screws 25b. It is preferred to locate a coil compression spring on the link 103 to absorb some of the axial pressure of the appropriate suction head against the carton head and to connect the crank 104 to the link 103 loosely by collar 104a abutting against the spring.

Following the head pressure and embossing operations by the members 32 and 33 the fingerpiece 35 comes into operation and drags the carton between a pair of guide plates 109 which are inclined to align with the U-shaped clip 36 about to enter the upper track plane of the conveyor 16. This finger 35 is carried by the upper end of an arcuate arm 35a pivoted between its ends to a lever 35b oscillated on an axis 35c, and at its lower end to an inverted L-shaped lever 35d oscillating at its lower end on an axis 35e. The components of movements imparted to this member 35a is such as to drag the finger 35 substantially radially in relation to the axis of the rotary member 13 and thereby urge the appropriate carton into the U-shaped clip 36.

Figure 8:
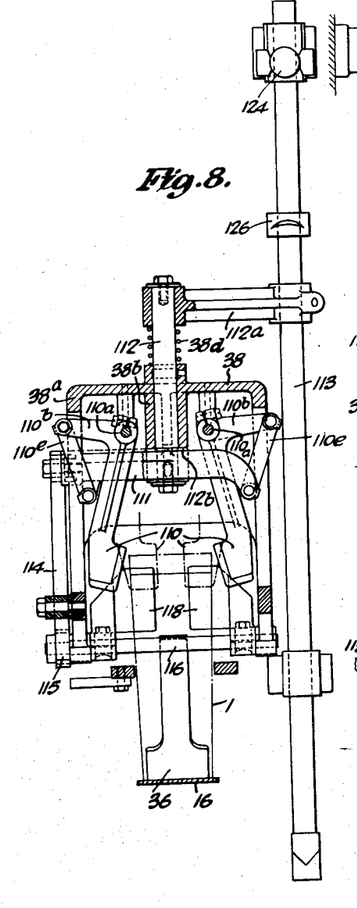
Figs. 8, 9 and 10 are side elevation end view and sectional plan of the mechanism for pleating and forming the open upper end of the cartons.
Figures 9, 10:
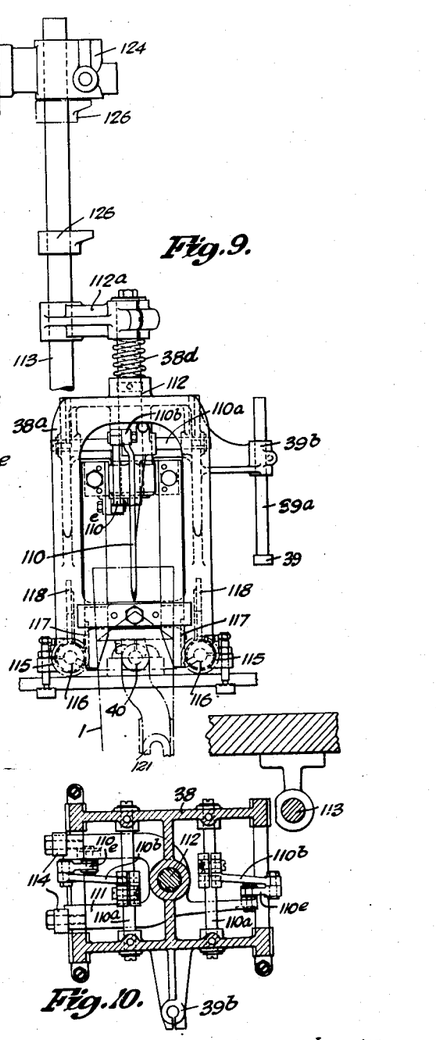

When each carton becomes located beneath the pinching device 38, the cage 38a of U-configuration comprising the body of this device, is lowered by the downward pull on a vertical rod 113, this rod having fixed to it the arm 112a from the free end of which depends a rod 112 on which is suspended the cage 38a. A coiled compressed spring 38d is interposed between the free end of the arm 112 and a centre sleeve 38b of the cage, and the lower end of this centre rod 112 is provided with a head 112b which abuts against the lower end of the sleeve 38b. When the case is lowered over a carton top, one limb of the cage abuts agingst a stop and the vertical rod 113 continues its downward movement against the influence of the spring 38d and applies an inward swinging movement to a pair of pinching fingers 110 which engage the creased centre parts 1j of the carton top and pinches the opposed sides inwardly V-fashion. This inward movement of the pinchers 110 is effected by connecting the cranked extensions 110b of the pinching members links 110e pivoted to a cross bar 111 slidable vertically relatively to the cage 38a. The levers 110b pivot on pins 110a supported in lugs in the cage. Simultaneously with this inward pinching operation of the members 110, a pair of side plates 118 parallel with the plane of movement of the pinching fingers 110 are swung inwardly from a normal inward position so that their upper free ends move towards each other and thereby the flat sides of the top of the carton are pressed towards each other inverted V fashion to complete the folding operation of the top of the carton. The plates 118 are fixed to and radiate from a pair of spindles 116 supported in bearings at the lower ends of the cage 118 and carrying a pair of pinions 115 which mesh with teeth 117 formed on the lower ends of two bars 114 depending from the cross bar 111. The cross bar 111 is of H-configuration to provide the requisite pair of limbs at one end to receive the upper ends of the two bars 114.

The two suction members which engage opposite sides of the carton as beforesaid are a pair of cups 40 with suction orifices covered by reticulated plates, the cups 40 being supported by a pair of nipples 120 carried by a pair of slotted vertical arms 121 which are adjustably clamped in position by studs. The nipples 120 receive conduits 123 extending from a valve device which automatically connects the members 40 to a source of suction when the cage 38a reaches its lowermost position. This valve device comprises a housing 124 with a spring-loaded valve having a depending pin against which abuts a collar 126 on the vertical rod 113 to cut off the suction and connect the conduit 123 to atmosphere when the rod 113 is raised, the spring-loaded valve opening automatically as the rod descends.

The beforesaid tamping member 39 is carried by a vertical rod 39a adjustable within a bracket 39b fixed to one side of the cage 38a.

It is desirable to afford a warning or to stop the machine when no cartons are being fed on to the formers 12, or alternatively, the carton misses a former, it is advisable to prevent a disc being adhered to the uncovered former. For this purpose each former has a transverse channel 12b near its free end, such channel containing a guide plate 12c along the free edge of which is adapted to travel a roller 130 on one end of a lever 131 connected by a rod 132 to means to prevent operation of the label cutting and feeding mechanism. By this means when a former without a carton is on its way to the stage where normally it would receive a label, it prevents a label from being cut off, and applied to the former. At the same time it is desirable to stop the machine and this can be effected automatically by making use of the upper suction head 25 which has not received a label to operate a switch. By reason of this suction head 25 not having a label it will be extended to a greater radius than if it was under the influence of suction, consequently a cam faced bar 144 on one side thereof will bear against a trigger 145 which has an extended limb 145a adapted to raise a push rod 146 which bears against and raises a round-headed pin 147 against a switch lever 148 which moves inwardly a contact carrying rod 149 carrying a pair of contacts 150, so that this pair of contacts is separated from a fixed pair of contacts 151 in a housing 152 mounted on a suitable part of the machine.

The conveyors 16 and 57 are arranged at right angles to each other so that the frame in the plan is of L-shape, the drum 45 of the waxing stage forming the elbow of the L.

I claim:

1. The combination with carton feeding means in which knock-down cartons are fed on to formers which carry the cartons through end closing stages, of means which folds and presses the base ends of the cartons flat on the ends of the formers, means applying sealing pieces to the pressed flat bases, an endless conveyor, carton supports on the conveyor, means to deliver the base sealed cartons base foremost into said supports, means to effect a partial closing of the mouth ends of the cartons whilst the cartons are on the conveyor, a wax proofing bath, a proofing stage conveyor disposed above said bath, carton grippers on said proofing stage conveyor adapted to receive and hold the base sealed and partially closed cartons and to convey them through the bath, a delivering conveyor and means to deliver the wax coated cartons from the proofing stage conveyor to the delivering conveyor.

2. In combination with means for opening out collapsed cartons and delivering them to shaping means, means to close and flatten the base ends of the cartons, means to adhere sealing pieces to such base ends, means to partially close the mouth ends of the base closed cartons working in synchronism with the base closing means, a waxing bath, means to immerse the base closed and partially mouth closed cartons in the bath and to convey them base foremost through the bath, and means automatically delivering a quantity of partially closed cartons simultaneously to the immersing means.

3. In combination with means for opening out collapsed cartons and delivering them to shaping means, means to close and flatten the base ends of the cartons, means to adhere sealing pieces to such base ends, means to partially close the mouth ends of the base closed cartons working in synchronism with the base closing means, said partially closing means comprising a pair of pinch bars moved automatically downwards and towards each other against two opposite sides of each carton, a conveyor to carry the cartons successively beneath the pinch bars, a pair of pivoted plates moved automatically against the other sides of the carton to form a tapered and pleated mouth, a waxing bath and means to deliver the pleated cartons successively to the bath for proofing them.

4. In combination with means for opening out collapsed cartons and shaping them to tubular form with sealed bases, a conveyor, holders on the conveyor for individual tubular cartons with sealed bases, pinchers above the conveyor to engage the upper ends of the cartons and to deform them at such ends into partially closed pleated mouths, means operating during such deformation applying suction to opposed walls of the cartons to restrain the cartons against collapse, a waxing bath, a further conveyor adapted to transfer the partially closed cartons to said bath, and means to carry the waxed cartons from the bath and to deliver them for collection.

5. In combination with means for opening out collapsed cartons and delivering them to shaping means, means to close and flatten the base ends of the cartons, means to adhere sealing pieces to such base ends, means to partially close the mouth ends of the base closed cartons working in synchronism with the base closing means, said means applying sealing pieces to the carton bases comprising a rotor, radiating members carried by the rotor, spring loaded presser plates at the free ends of the radiating members, means connecting said plates to a source of suction, ports opened and closed by the movement of said rotor to effect and break such connection, means to deliver sealing pieces on to said plates, and means to move the disc carrying plates against the formers carrying cartons to transfer the discs to the cartons, a conveyor moving in synchronism with said rotor adapted to convey the cartons into the operative zone of the said partially closing means, a waxing bath and means to convey the partially closed cartons from said conveyor to the bath.

6. A machine for shaping, pre-treating and delivering cartons proofed and shaped for filling, comprising means to deliver flattened tubular carton blanks singly from a stack and to distend them into open tubular form, a number of formers, means to press the carton tubes on to said formers so that one end of each carton projects beyond the appropriate former, means co-operating with the formers to fold the projecting ends in to "rosette" or pleated bases, means to adhere sealing discs to said bases, means operating synchronously with the beforesaid means to deform the other end of each carton into a readily foldable and partially closed mouth, a wax bath, conveying means to receive and carry the cartons through the bath, and means automatically stopping delivery of a sealing disc or the like to a former not fitted with a carton.

7. In a machine for shaping, pre-treating and delivering cartons proofed and shaped for filling, in which means is provided to deliver flattened tubular carton blanks singly from a stack and to distend them into open tubular form and feed them on to a number of formers, means co-operating with the formers to fold the projecting ends into flattened "rosette" or pleated bases, means to adhere sealing pieces to said bases, a conveyor means to deliver the base closed cartons on to said conveyor, means located above said conveyor to deform the other end of each carton into a readily foldable and partially closed mouth, a wax bath, a proofing stage conveyor adapted to receive and convey the cartons in successive sets through the wax bath, a conveyor to receive the sets of waxed cartons in succession, means to carrry the cartons from the waxing bath on to said latter conveyor, and means with said latter conveyor for removing surplus wax from the cartons.

8. In combination with means for opening out collapsed cartons and delivering them on to formers, means to close and flatten the base ends of the cartons into rosette bases comprising a head adapted to be pressed against one end of each former, four presser blocks slidable across said head each with one side radial in relation to the centre of the head and with a carton base engaging face uni-lateral in relation to said radial side, each block having an inner or leading end which is inclined in two dimensions to engage the carton bases, means to adhere sealing pieces to such base ends, means to partially close the mouth ends of the base closed cartons working in synchronism with the base closing means, a waxing bath, means to immerse the base closed and partially mouth closed cartons in the bath and to convey them base foremost through the bath, and means automatically delivering a quantity of partially closed cartons simultaneously to the immersing means.

CARL WILHELM HARTMANN.